United States Patent
Shariat et al.

(10) Patent No.: US 11,206,577 B2
(45) Date of Patent: Dec. 21, 2021

(54) METHOD AND APPARATUS FOR IMPROVING FRONTHAUL INTERFACES IN WIRELESS COMMUNICATION SYSTEM

(71) Applicant: Samsung Electronics Co., Ltd., Suwon-si (KR)

(72) Inventors: Mehrdad Shariat, Middlesex (GB); Yue Wang, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/753,551

(22) PCT Filed: Oct. 15, 2018

(86) PCT No.: PCT/KR2018/012091
§ 371 (c)(1),
(2) Date: Apr. 3, 2020

(87) PCT Pub. No.: WO2019/078556
PCT Pub. Date: Apr. 25, 2019

(65) Prior Publication Data
US 2020/0296628 A1 Sep. 17, 2020

(30) Foreign Application Priority Data
Oct. 16, 2017 (GB) ..................... 1716960

(51) Int. Cl.
*H04W 28/10* (2009.01)
*H04W 28/08* (2009.01)
(52) U.S. Cl.
CPC .......... *H04W 28/10* (2013.01); *H04W 28/08* (2013.01)

(58) Field of Classification Search
None
See application file for complete search history.

(56) References Cited

U.S. PATENT DOCUMENTS

| | | | |
|---|---|---|---|
| 2014/0031049 A1* | 1/2014 | Sundaresan | H04W 84/042 455/447 |
| 2014/0363163 A1 | 12/2014 | Morper et al. | |
| 2017/0079059 A1* | 3/2017 | Li | H04W 16/02 |
| 2017/0099658 A1* | 4/2017 | Shattil | H04L 63/061 |
| 2017/0164215 A1 | 6/2017 | Chen et al. | |
| 2017/0164236 A1* | 6/2017 | Boldi | H04L 27/2602 |
| 2017/0164349 A1 | 6/2017 | Zhu et al. | |
| 2018/0013680 A1* | 1/2018 | Bull | H04W 16/14 |
| 2019/0124648 A1* | 4/2019 | Sun | H04W 28/08 |
| 2019/0208575 A1* | 7/2019 | Barbieri | H04W 88/085 |

(Continued)

FOREIGN PATENT DOCUMENTS

| | | |
|---|---|---|
| TW | 201720222 A | 6/2017 |
| WO | 2017044151 A1 | 3/2017 |

(Continued)

OTHER PUBLICATIONS

Turk Telekom, "Network Slicing Solution with RAN Slicing", TSG SA Meeting #SP-73, Sep. 21-23, 2016, SP-160534, 9 pages.

(Continued)

*Primary Examiner* — Kenny S Lin

(57) ABSTRACT

Method and apparatus for improving fronthaul interfaces in wireless communication is provided. An apparatus of managing slicing in a fronthaul connection between entities in a Radio Access Network, RAN, comprises at least one processor configured to: estimate load on the fronthaul connection; and split traffic on a plurality of fronthaul slices according to a predetermined criterion.

14 Claims, 3 Drawing Sheets

(56) References Cited

U.S. PATENT DOCUMENTS

2019/0273641 A1* 9/2019 Cavalcante ......... H04L 27/0008
2019/0281501 A1* 9/2019 Berg ................. H04W 28/0268
2020/0059521 A1* 2/2020 Sciancalepore ......... H04L 67/34

FOREIGN PATENT DOCUMENTS

| WO | 2017/070635 | A1 | 4/2017 |
| WO | 2017074486 | A1 | 5/2017 |
| WO | 2017119844 | A1 | 7/2017 |
| WO | 2017155327 | A1 | 9/2017 |

OTHER PUBLICATIONS

Supplementary European Search Report dated Sep. 23, 2020 in connection with European Patent Application No. 18 86 8836, 9 pages.

ISA/KR, International Search Report and Written Opinion of the International Searching Authority, International Application No. PCT/KR2018/012091, dated Jan. 24, 2019, 11 pages.

Combined Search and Examination Report for Application No. GB1716960.8 dated Mar. 29, 2018, 8 pages.

China Mobile Research Institute, et al., White Paper of Next Generation Fronthaul Interface Version 1.0, Jun. 4, 2015, 40 pages.

Samsung, "Function split between central and remote node," R3-160679, 3GPP TSG-RAN WG3 Meeting #91 bis, Bangalore, India, Apr. 11-15, 2016, 3 pages.

Samsung, "Comparison for Function split in fronthaul," R3-161066, 3GPP TSG-RAN WG3 Meeting #92, Nanjing, China, May 23-27, 2016, 2 pages.

Communication pursuant to Article 94(3) EPC dated Aug. 13, 2021, in connection with European Application No. 18868836.0, 5 pages.

* cited by examiner

[Fig. 1]
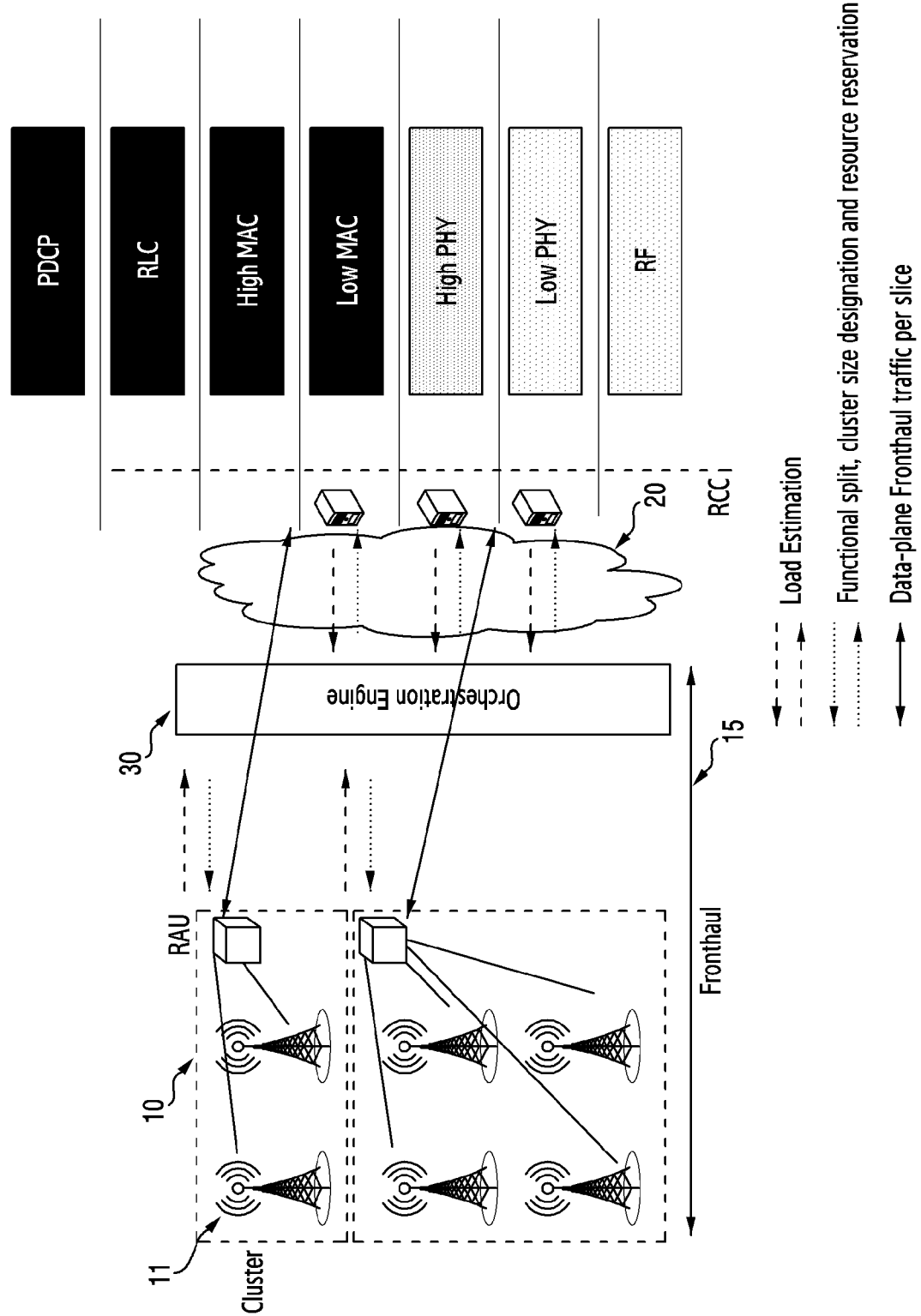

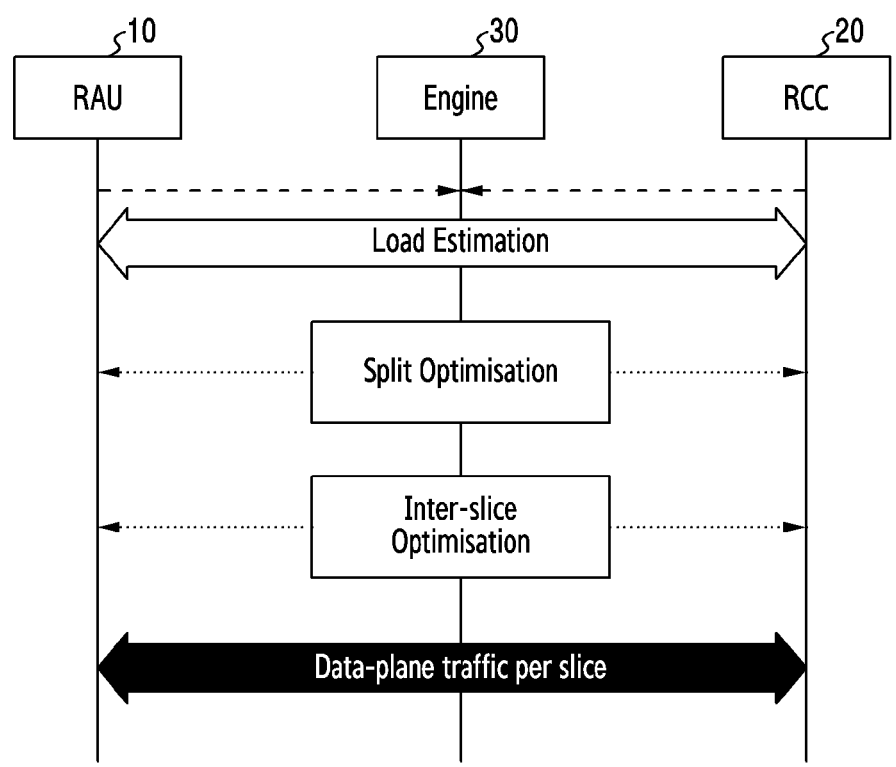
[Fig. 2]

[Fig. 3]
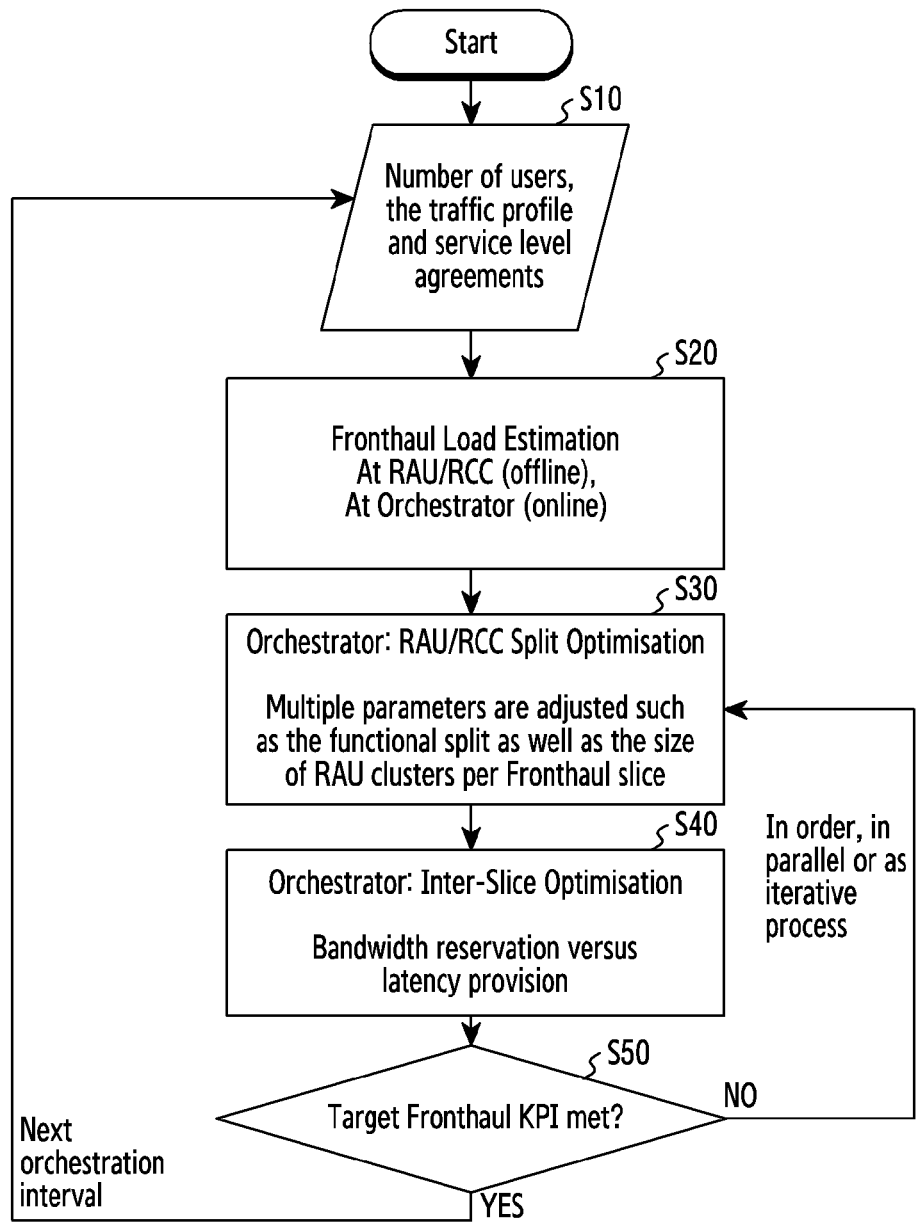

METHOD AND APPARATUS FOR IMPROVING FRONTHAUL INTERFACES IN WIRELESS COMMUNICATION SYSTEM

CROSS-REFERENCE TO RELATED APPLICATIONS

This application is a 371 National Stage of International Application No. PCT/KR2018/012091, filed Oct. 15, 2018, which claims priority to United Kingdom Patent Application No. GB 1716960.8, filed Oct. 16, 2017, the disclosures of which are herein incorporated by reference in their entirety.

BACKGROUND

1. Field

The present disclosure relates to improvements in the provision and organisation of fronthaul interfaces in wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Embodiments of the disclosure provide a novel network entity at the fronthaul—the so called Fronthaul Orchestrator Engine. Embodiments also provide relevant signaling and protocols that operate fronthaul slicing by exploiting network traffic estimation, relevant analytics and intelligent learning algorithms.

According to the present disclosure there is provided an apparatus and method as set forth in the appended claims. Other features of the disclosure will be apparent from the dependent claims, and the description which follows.

According to various embodiments of the present disclosure, an apparatus of managing slicing in a fronthaul connection between entities in a Radio Access Network, RAN, is provided. The apparatus comprises at least one processor configured to: estimate load on the fronthaul connection; and split traffic on a plurality of fronthaul slices according to a predetermined criterion.

According to various embodiments of the present disclosure, a method of managing slicing in a fronthaul connection between entities in a Radio Access Network, RAN, is provided. The method comprises estimating load on the fronthaul connection; and splitting traffic on a plurality of fronthaul slices according to a predetermined criterion.

Embodiments of the disclosure provide a novel network entity at the fronthaul—the so called Fronthaul Orchestrator Engine. Embodiments also provide relevant signaling and protocols that operate fronthaul slicing by exploiting network traffic estimation, relevant analytics and intelligent learning algorithms.

Although a few preferred embodiments of the present disclosure have been shown and described, it will be appreciated by those skilled in the art that various changes and modifications might be made without departing from the scope of the disclosure, as defined in the appended claims.

BRIEF DESCRIPTION OF THE DRAWINGS

For a better understanding of the disclosure, and to show how embodiments of the same may be carried into effect, reference will now be made, by way of example only, to the accompanying diagrammatic drawings in which:

FIG. 1 shows a sample network implementation according to an embodiment of the disclosure, showing various network entities;

FIG. 2 shows a typical sequence of messages according to an embodiment of the present disclosure; and FIG. 3 shows a flowchart of a method according to an embodiment of the present disclosure.

DETAILED DESCRIPTION

Embodiments provide a novel Fronthaul Orchestrator Engine (FOE) in charge of slicing network resources in fronthaul between any two remote (RAU) and centralised (RCC) entities via optimizing a multitude of parameters including (but not limited to) the RAN functional split option or RAU cluster size.

Centralisation of radio access network (C-RAN) functionalities has been considered for emerging and future cellular networks. In C-RAN, centralised RAN functions are located in an entity known as a Centralised Baseband Unit (BBU) with Remote Radio Units (RRUs) responsible for the remainder of the radio access connectivity between the User Equipment (UE) and the network (e.g. on RF/PHY levels).

Such a functional split versus a more traditional distributed RAN (D-RAN) brings several advantages including accelerated network deployment on the RRU side, reduced operating costs (although Capital Expenditure can be high in short term), support for richer multi-node network cooperation and coordination (e.g. on Coordinated Multi-Point systems or Carrier Aggregation) and improved network performance, in particular at cell edge.

To support such a functional split between BBU and RRU, a Common Public Radio Interface (CPRI) has been proposed to support fronthaul connectivity, which is the connection between BBU and RRUs. However, CPRI typically requires strict high bandwidth, low delay, tight synchronisation and additional transmission equipment, partly attributable to its Point-to-Point connectivity paradigm.

To address the above issues, the next-generation Fronthaul interface (NGFI) redefines interface flexibility and network functional split between remote and centralised units. Such an interface enables statistical multiplexing on fronthaul bandwidth, decoupling interface traffic from some RF-level attributes (e.g. number of antennas) and results in more flexible remote unit connectivity to a centralised unit.

In line with recent advancement on NGFI, RRUs are divided into clusters (based on proximity, inter-cluster interference footprint or other similar criteria), and each cluster may possess one logical entity termed as Remote Aggregation Unit (RAU) that can be physically located as part of one of RRUs per cluster or as a separate individual entity. The RAU is in charge of radio resource management per cluster.

As the functional split can dynamically switch between remote RAU and the centralized entity, the new centralised entity is defined as a Radio Cloud Centre (RCC) to convey a multitude of functionalities beyond conventional BBU.

The above described flexible NGFI opens a new network design paradigm where node-connectivity between centralised and remote units transforms from Point-to-Point or Point-to-Multi Point into Many-to-Many connectivity comprising a hybrid of wired and wireless solutions. In other words, a multi-tier shared network forms the fronthaul where the slicing of network resources between centralised and remote units can be dynamically tuned in an on-demand fashion.

The slicing of network resource (especially in a dynamic and flexible manner) at fronthaul between RAU and RCC can be complex, as it is affected by multiple factors and their changing contexts. Such factors include the clustering on the RAU side (the size, how they are clustered, etc.), the functional split between RAU and RCC entities and dimensionality of solution space on network resources to be reserved on fronthaul (power, processing capability, radio resources, buffering memory, route to be selected across multiple fronthaul nodes, etc.).

As a result and in light of the new network design paradigm, existing solutions applicable to simple radio resource reservation on radio interfaces or fully abstracted end-to-end network management solutions are not directly applicable. Therefore, embodiments of the present disclosure seek to address issues with resource management in a fronthaul interface scenario.

FIG. 1 shows a representation of a typical implementation, comprising 2 RAUs 10, each comprising a plurality of individual base stations 11 arranged into a cluster. Interposed between the RAUs and the Radio Cloud Centre (RCC) 20, is a Fronthaul Orchestration Engine (FOE) according to an embodiment of the present disclosure. Details of its operation follow.

Two modes of operation are presented, each comprising certain network entities as below.

Online Mode:

In this mode of operation, the Fronthaul Orchestrator Engine forms part of both data-plane and control plane connectivity between RAU and RCC entities and below operations are followed accordingly. Data-plane connectivity means that actual voice and data traffic passes through the FOE, providing real-time access to the data and allowing the FOE to have direct access to the data, enabling it to make real-time calculations regarding load and traffic.

Fronthaul Load Estimation

The FOE monitors the upcoming data traffic load on Uplink (UL) or Downlink (DL) per RAU-RCC pair on the fronthaul, taking into account one or more of the following: number of users, the traffic profile and service requirements of the users. Uplink (UL) refers to traffic from RAU towards RCC and Downlink (DL) refers to traffic from RCC towards RAU.

RAU-RCC Split Optimisation

The FOE may split the traffic on UL (DL) per RAU across multiple fronthaul slices (towards different RCC entities), according to one or multiple criteria, e.g., ensuring each slice encompasses user traffic with similar service profiles and requirements.

The FOE decides on multiple parameters, such as the functional split as well as the size of RAU clusters per fronthaul slice, taking into account the current load estimation between corresponding RAU and RCC entities. As an example, the functional split for fronthaul slices with lower load estimation (in terms of bandwidth/latency requirement) can be adjusted from a lower layer split (with stricter requirement) to an upper layer split (with a more relaxed requirement) as shown in FIG. 1.

Fronthaul Inter-slice Optimisation

The FOE optimises the bandwidth reservation versus latency provision across all fronthaul slices taking into account Traffic and Functional split per RAU-RCC.

The above optimisation steps can be executed in the order given, or in parallel (via accumulating all information within the FOE) or iteratively with a feedback loop (via incrementally moving the network resources from fronthaul slices in excess to fronthaul slices in shortage, until the target key performance indicator (KPI) in the fronthaul network is met). In particular, when executed with a feedback loop, this may be carried out via reinforcement learning algorithms.

Offline Mode:

In this mode of operation, the FOE is not part of data-plane connectivity between RAU or RCC entities but benefits from control-plane connectivity to these entities. In other words, the actual voice and data traffic does not pass through the FOE and extra signalling is provided, as a proxy for access to this raw information.

The Offline Mode better suits scenarios where the fronthaul and/or the corresponding FOE is operated as a separate independent service from the RAN and direct access to data traffic is not possible due to privacy or security issues.

From an operational perspective, this mode of operation follows very similar steps to that outlined above in connection with the Online Mode, except that in the load estimation steps, the RAU (RCC) entities provide load estimation metrics on UL (DL) via control-plane signalling to the Orchestrator. Similarly, RAU (RCC) entities assist in splitting per RAU traffic across multiple slices.

FIG. 2 shows an illustration of the messaging between the various network entities involved—the RAU 10, the RCC 20 and the FOE 30. The RAU and RCC provide information (either directly in online mode or indirectly in offline mode) regarding data traffic volume to the FOE, which then performs the steps of Split Optimisation and Inter-slice Optimisation and provides instructions to the RAU 10 and RCC 20.

FIG. 3 shows a flowchart setting out steps in a method according to an embodiment of the present disclosure.

At step S10, the number of users, the traffic profile and service level agreements are determined.

At step S20, the FOE performs a fronthaul load estimation, in either online or offline mode, as described.

At step S30, the FOE optimises the split by considering multiple parameters, including one or more of: the functional split, as well as the size of RAU clusters per fronthaul slice.

At step S40, the FOE performs inter-slice optimisation, considering parameters such as bandwidth reservation versus latency provision.

At step S50, a determination is made if a target KPI has been met in connection with the fronthaul interface. If not, then flow returns to step S30 and this and step S40 are repeated until the desired result is achieved. As noted, steps S30 and S40 can be performed in sequence, as shown or in parallel. Preferably, they are performed as an iterative process so that improvements can be made continually.

If the KPI is met, then flow returns to step S10 and the next defined orchestration interval begins.

Embodiments of the disclosure also provide signalling messages on interfaces between the FOE and network entities corresponding to and supporting the above mentioned operational modes.

For instance, the Control-plane interface between FOE/RAU and FOR/RCC is utilised for load estimation signalling (in offline mode) as well as notifying RAU (RCC) entities of functional split, cluster size and reserved resources per fronthaul slice or RAU (in both offline and online modes).

The Data-plane interface between FOE/RAU and FOE/RCC is utilised for load monitoring and/or estimation (in online mode) and splitting per RAU traffic on UL (DL) across multiple fronthaul slices when needed (again in online mode).

Embodiments of the present disclosure allow an optimised fronthaul interface to be provided. The use of a Fronthaul Orchestration Engine and associated techniques enables the solution to be offered in both online and offline modes, operable to fit in with particular network planning and operational requirements.

A Fronthaul Orchestrator Engine according to an embodiment of the disclosure enable Fronthaul slicing to be performed, which has not been considered in the prior art. The Fronthaul Orchestrator Engine enables flexible and dynamic Fronthaul slicing between any two remote (RAU) and centralised (RCC) entities in the RAN. Embodiments of the disclosure permit a whole new set of signaling, protocols, and functionalities to be defined and optimised, providing a beneficial impact on fronthaul architecture, performance and standards.

According to a first aspect of the present disclosure, there is provided an apparatus operable to manage slicing a fronthaul connection between entities in a Radio Access Network, RAN, the apparatus being operable to: estimate load on the fronthaul connection; and split traffic on a plurality of fronthaul slices according to a predetermined criterion.

In an embodiment, the predetermined criterion concerns whether each of the plurality of fronthaul slices comprises user traffic with similar service profiles and requirements.

In an embodiment, the apparatus is further operable to define a functional split or the size of RAU clusters per each of the plurality of fronthaul slices.

In an embodiment, the apparatus is further operable to optimise bandwidth reservation versus latency across the plurality of fronthaul slices by considering traffic and the functional split between the entities concerned.

In an embodiment, the apparatus is arranged to operate in either an online or an offline mode, wherein in the online mode, the apparatus forms part of data-plane and control-plane connectivity and in the offline mode, the apparatus forms part of the control plane connectivity only.

In an embodiment, in online mode, the estimation of load on the fronthaul connection utilises the data-plane connectivity to monitor upcoming data traffic.

In an embodiment, the entities in the RAN comprise at least one Radio Access Unit, RAU, and at least one Radio Cloud Centre, RCC.

According to a second aspect of the present disclosure, there is provided a method of managing slicing in a fronthaul connection between entities in a Radio Access Network, RAN, comprising the steps of: estimating load on the fronthaul connection; and splitting traffic on a plurality of fronthaul slices according to a predetermined criterion.

In an embodiment, the predetermined criterion concerns whether each of the plurality of fronthaul slices comprises user traffic with similar service profiles and requirements.

In an embodiment, the method further comprises the step of defining a functional split or the size of RAU clusters per each of the plurality of fronthaul slices.

In an embodiment, the method further comprises the step of optimising bandwidth reservation versus latency across the plurality of fronthaul slices by considering traffic and the functional split between the entities concerned.

In an embodiment, the method further comprises the step of operating in either an online or an offline mode, wherein in the online mode, data-plane and control-plane connectivity is provided and in the offline mode, control plane connectivity only is provided.

In an embodiment the step of estimating load on the fronthaul connection utilises the data-plane connectivity to monitor upcoming data traffic.

In an embodiment, the entities in the RAN comprise at least one Radio Access Unit, RAU, and at least one Radio Cloud Centre, RCC.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus of managing slicing in a fronthaul connection between entities in a radio access network (RAN), the apparatus comprising:
   at least one processor configured to:
      estimate load on the fronthaul connection;
      determine a functional split and a size of remote aggregation unit (RAU) clusters for each of a plurality of fronthaul slices, based on the estimated load; and
      perform a traffic split on the plurality of fronthaul slices, based on the determined RAU clusters size and the determined functional split.

2. The apparatus of claim 1, wherein the each of the plurality of fronthaul slices comprises user traffic with similar service profiles and requirements.

3. The apparatus of claim 1, wherein the at least one processor is further configured to optimize bandwidth reservation versus latency across the plurality of fronthaul slices by considering the traffic split and the functional split between the entities concerned.

4. The apparatus of claim 1, wherein the apparatus is arranged to operate in either an online mode or an offline mode, wherein in the online mode, the apparatus forms part of data-plane connectivity and control-plane connectivity and in the offline mode, the apparatus forms part of the control-plane connectivity only.

5. The apparatus of claim 4, wherein in online mode, the estimation of the load on the fronthaul connection utilizes the data-plane connectivity to monitor upcoming data traffic.

6. The apparatus of claim 1, wherein the entities in the RAN comprise at least one RAU and at least one radio cloud centre (RCC).

7. A method of managing slicing in a fronthaul connection between entities in a radio access network (RAN), the method comprising:
   estimating load on the fronthaul connection;
   determining a functional split and a size of remote aggregation unit (RAU) clusters for each of a plurality of fronthaul slices, based on the estimated load; and
   performing a traffic split on the plurality of fronthaul slices, based on the determined RAU clusters size and the determined functional split.

8. The method of claim 7, wherein the each of the plurality of fronthaul slices comprises user traffic with similar service profiles and requirements.

9. The method of claim 8, wherein:
   the method is configured to be operated in either an online mode or an offline mode, and
   in the online mode, data-plane connectivity and control-plane connectivity is provided and in the offline mode, the control-plane connectivity only is provided.

10. The method of claim 8, wherein the entities in the RAN comprise at least one RAU and at least one radio cloud centre (RCC).

11. The method of claim 7, further comprising:
   optimizing bandwidth reservation versus latency across the plurality of fronthaul slices by considering the traffic split and the functional split between the entities concerned.

12. The method of claim 7, wherein the method is configured to be operated in either an online mode or an offline mode, and
   wherein in the online mode, data-plane connectivity and control-plane connectivity is provided and in the offline mode, the control-plane connectivity only is provided.

13. The method of claim 12, wherein in online mode, estimation of the load on the fronthaul connection utilizes the data-plane connectivity to monitor upcoming data traffic.

14. The method of claim 7, wherein the entities in the RAN comprise at least one RAU and at least one radio cloud centre (RCC).

* * * * *